United States Patent [19]

Rylander

[11] Patent Number: 5,602,572

[45] Date of Patent: Feb. 11, 1997

[54] THINNED HALFTONE DOT PATTERNS FOR INKJET PRINTING

[75] Inventor: Richard L. Rylander, Stillwater, Minn.

[73] Assignee: Minnesota Mining and Manufacturing Company, St. Paul, Minn.

[21] Appl. No.: 295,603

[22] Filed: Aug. 25, 1994

[51] Int. Cl.$^6$ .................................................. B41J 2/205
[52] U.S. Cl. ..................... 347/15; 347/131; 347/183; 347/240; 358/298
[58] Field of Search .................... 347/15, 43, 107, 347/131, 183, 251, 254, 240; 358/298, 534, 456; 382/257, 260, 302, 308

[56] References Cited

U.S. PATENT DOCUMENTS

| | | | |
|---|---|---|---|
| 4,084,259 | 4/1978 | Cahill et al. | 364/900 |
| 4,651,175 | 3/1987 | Tazaki | 347/9 |
| 5,353,387 | 10/1994 | Petschik et al. | 395/109 |
| 5,416,612 | 5/1992 | Ingraham et al. | 358/501 |

FOREIGN PATENT DOCUMENTS

| | | | |
|---|---|---|---|
| 0513989A2 | 11/1992 | European Pat. Off. | B41J 2/205 |
| 0516420A2 | 12/1992 | European Pat. Off. | B41J 2/205 |
| WO91/14578 | 10/1991 | WIPO | B41J 2/505 |

*Primary Examiner*—Benjamin R. Fuller
*Assistant Examiner*—Craig A. Hallacher
*Attorney, Agent, or Firm*—Carolyn A. Bates; Steven J. Shumaker

[57] ABSTRACT

A set of thinned halftone dot patterns useful in inkjet printing comprises a plurality of halftone cells corresponding to respective shade values. Each of the halftone cells includes a plurality of addressable points, with at least some of the points being turned "on" to define a halftone dot pattern, and at least some of the "on" points defining a core component of the halftone dot pattern being selectively turned "off", thereby producing a thinned halftone dot pattern. The thinned halftone dot patterns enable the use of higher addressability in an inkjet printing system to achieve a wider range of shade values while avoiding undesirable over-inking of printed halftone dot patterns due to excessive overlap between printed ink spots. The thinned halftone dot patterns prevent significant overlap between adjacent ink spots in the core, or "interior", component when the halftone dot pattern is printed by the inkjet printing system, but preserves the entire edge component to maintain desired halftone cell definition. Thinned halftone cells can be stored in a memory as "glyphs" and retrieved by an inkjet printing system to print higher addressability halftone images with enhanced quality and a wider range of shade values.

26 Claims, 7 Drawing Sheets

THINNED HALFTONE DOT PATTERNS FOR INKJET PRINTING

FIELD OF THE INVENTION

The present invention relates to inkjet printing, and, more particularly, to techniques for improving halftone image quality in inkjet printing.

DISCUSSION OF RELATED ART

Digital halftone techniques enable continuous tone images to be represented on a bilevel device by simulating the screening process used in conventional printing. A typical digital halftone technique models a continuous tone image as an array of halftone cells. The halftone cells are assigned shade values according to shade values present in corresponding areas of the continuous tone image. Each halftone cell typically has a fixed size, and is defined by a matrix of addressable points that can be selectively turned "on" in a digital manner to form various patterns. The points typically are assigned different shade thresholds according to an "ordered dither" halftone pattern. If the shade value of the halftone cell is greater than the shade threshold of a particular point, the point is turned "on". The patterns formed by the "on" points define halftone dot patterns having different shapes and sizes determined according to the ordered dither. The various halftone dot patterns can be selectively printed or displayed to convey an appearance of different shade values to a human viewer.

A bilevel device presents a halftone dot pattern to the human viewer by placing spots at locations corresponding to each point that has been turned "on" in the respective halftone cell. In a printing system, for example, the spots may be formed by depositing ink or toner on a printing substrate at locations corresponding to the "on" points. In a display device, the spots may be represented on a cathode ray tube by raster scanning phosphors residing at appropriate locations on a screen. The shade thresholds of points within a halftone cell typically are determined such that the shade value range progresses from light to dark by first placing spots in the center of the cell, and then increasing the shade value by growing the dot pattern with the addition of spots to the edges of existing dot pattern clusters. The range of shade values that can be represented with the digital halftone technique is limited to the number of different dot patterns that can be formed within the cell. The number of different dot patterns, in turn, is a direct function of the number of addressable points within the cell that can accommodate a spot.

A wider range of shade values can be achieved by increasing the number of addressable points within each cell, and thus the number of different dot patterns that can be formed. One technique for increasing the number of points in a cell involves simply increasing the size of each cell while maintaining the same degree of addressability of the points. Unfortunately, increased cell size produces a coarser halftone pattern, resulting in less desirable image quality. A second technique for enlarging the range of shade values maintains cell size, but increases the number of addressable points within the cell. The increased number of points within the same area necessarily decreases the distance between adjacent points in the halftone cell. The second technique has been used to increase the shade value range for some electrostatic and laser-scanned printing devices. Higher addressability increases spot overlap, allowing the formation of smoother dot edges, but also leads to overexposure of dot interiors. In high contrast, electrophotographic or electrostatic systems, overexposure is not a problem because the media is developed or toned to produce a limiting maximum density in any area receiving more than a threshold exposure. Thus, the primary effect of higher addressability is increased control of dot shape and size.

Higher addressability would be desirable in inkjet printing systems as a means to provide a wider range of shade values. Inkjet printing systems, however, are very sensitive to spot overlap. Specifically, higher addressability can produce a significant overlap in adjacent ink spots, resulting in an accumulation of excess ink in the interior of the dot pattern. The excess ink not only increases the density of the dot pattern interior, but also has an effect on overall dot size due to ink smearing and wicking into the oversaturated printing substrate. Thus, the shade value of the resulting printed dot pattern may not correspond to the desired shade value. The size of the ink spots in a typical inkjet printing system cannot readily be adjusted to avoid overlap during high addressability printing due to generally fixed design characteristics of both the inkjet nozzle and the ink. Consequently, overinking problems have hindered the use of higher addressability halftone cells in inkjet printing systems, limiting the available range of halftone shade values.

SUMMARY OF THE INVENTION

In view of the problems associated with higher addressability inkjet printing, the present invention provides a set of thinned halftone dot patterns that enables the use of higher addressability inkjet printing to achieve a wider range of shade values while avoiding undesirable over-inking of printed halftone dot patterns. The set of thinned halftone dot patterns of the present invention prevents significant overlap between adjacent ink spots in a core component of the halftone dot pattern when the pattern is inkjet printed, but preserves spots in an edge component of the dot pattern to maintain the ability to incrementally adjust dot size and hence shade value.

Additional features and advantages of the present invention will be set forth in part in the description that follows, and in part will be apparent from the description, or may be learned by practice of the present invention. The advantages of the present invention will be realized and attained by means particularly pointed out in the written description and claims hereof, as well as in the appended drawings.

To achieve the foregoing advantages, as broadly embodied and described herein, the present invention provides, in a first embodiment, a system and method for generating a set of thinned halftone dot patterns for inkjet printing. The system and method comprise the generation of a halftone cell defined by a plurality of addressable points arranged in a matrix, at least some of the points being turned "on" to define a halftone dot pattern, selection of a plurality of the "on" points defining a core component of the halftone dot pattern, and the selective turning "of off" of at least some of the "on" points of the core component to produce the thinned halftone dot pattern.

In a second embodiment, the present invention provides an inkjet printing system and method employing a set of thinned halftone dot patterns. The system and method comprise the reception of image data representing a plurality of image dots, each of the image dots having one of a plurality of shade values, matching of each of the image dots with one of a plurality of thinned halftone dot patterns stored in a memory based on the shade value of the respective one of the image dots, wherein each of the thinned halftone dot patterns in the memory corresponds to a respective one of the shade values and represents a result of generation of a halftone cell defined by a plurality of addressable points arranged in a matrix, at least some of the points being turned "on" to define a halftone dot pattern, wherein the halftone dot pattern corresponds to the respective one of the shade values, selection of a plurality of the "on" points defining a core component of the halftone dot pattern, and selective turning "off" of at least some of the points of the core component to produce one of the plurality of thinned halftone dot patterns, and printing of, for each of the image dots, a representation of the respective one of the thinned halftone dot patterns matched with each of the image dots on a printing substrate.

The present invention also provides, in a third embodiment, a set of thinned halftone dot patterns for inkjet printing. The set comprises a plurality of halftone cells, each of the halftone cells corresponding to a respective one of a plurality of shade values, a plurality of addressable points within each of the halftone cells, at least some of the points being turned "on" to define a halftone dot pattern, and a plurality of the "on" points defining a core component of the halftone dot pattern being selectively turned "off", thereby producing a thinned halftone dot pattern.

It is to be understood that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

DETAILED DESCRIPTION OF THE PREFERRED EMBODIMENTS

Figure 1:
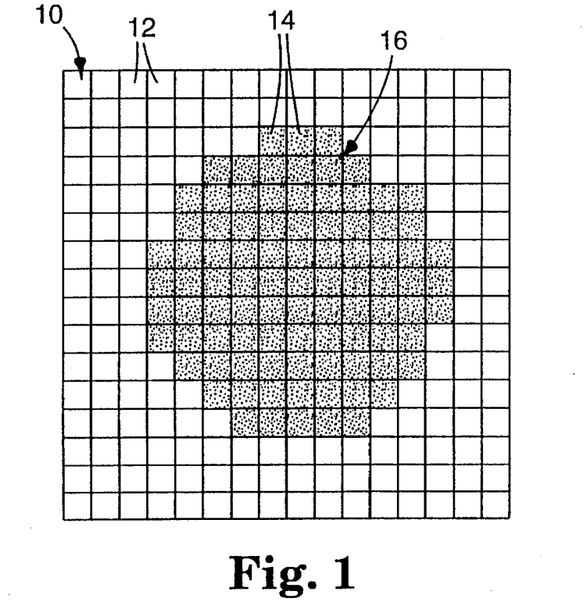
FIG. 1 is a bitmap diagram of an exemplary halftone cell having a halftone dot pattern.

FIG. 1 is a bitmap diagram of an exemplary halftone cell 10, useful in describing the present invention. The halftone cell 10 forms part of an overall halftone image, and includes a plurality of addressable points 12. The term "point," as used in this description, refers to a location in a two-dimensional matrix, addressable by a pair of matrix coordinates. The points 12 can be digitally turned "on" at selected locations in the matrix to produce "on" points 14 that define a halftone dot pattern 16 within halftone cell 10. The term "dot pattern," as used in this description, refers to a cluster of "on" points 14 that varies in size and shape as a function of a shade value of halftone cell 10. The shade value of halftone cell 10 is determined by the shade value of a corresponding area in an original continuous tone image represented by the overall halftone image. The dot pattern 16 can be physically reproduced on a printing substrate with an inkjet printer by placing ink spots at locations corresponding to "on" points 14.

The halftone cell 10 of FIG. 1 is characterized, for purposes of this description, by a square, sixteen-by-sixteen matrix of points 12 defining a single dot pattern 16. However, the structure of halftone cell 10 may be subject to several variations, as determined by the requirements of particular printing applications. For example, the addressability of halftone cell 10 may be changed to increase or decrease the number of points 12 available within the cell relative to the 256 points shown in FIG. 1. In addition, halftone cell 10 may include more than a single dot pattern 16. Specifically, halftone cell 10 may contain two or more discrete dot pattern clusters defined by "on" points 14. Finally, the square matrix of halftone cell 10 alternatively may be realized by rectangular, or even non-rectangular, matrices.

Figure 2:
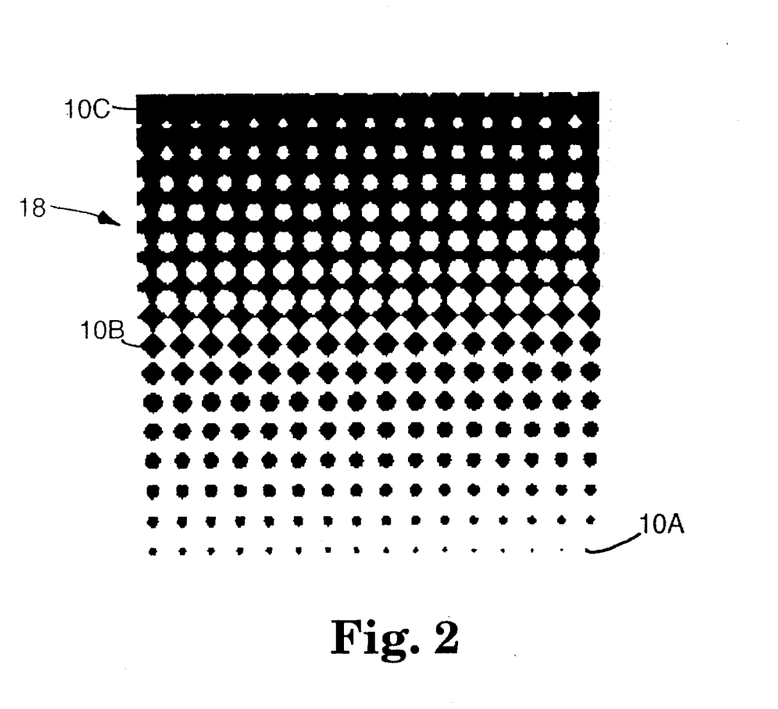
FIG. 2 is a bitmap diagram illustrating a range of shade values for the halftone cell shown in FIG. 1.

FIG. 2 is a bitmap diagram illustrating a shade value range 18 for halftone cell 10 employing a set of ordinary halftone dot patterns 16. The shade value range 18 is based on the number of different shade values that can be produced using the sixteen-by-sixteen matrix of addressable points 12 within halftone cell 10. value range 18 comprises 256 different shade values, with each shade value being represented by a sixteen-by-sixteen point halftone cell 10 having a different dot pattern 16. The halftone dot pattern 16 defined by "on" points 14 is centered in each halftone cell 10, and can be grown outward to increase the shade value by turning on additional points 12 at the edge of the existing dot pattern cluster. The shade value range 18 illustrates the manner in which the shade value of dot pattern 16 can be increased from light to dark by generating additional "on" points 14 in halftone cell 10.

The shade value range 18 includes, for example, a lightest shade value corresponding to halftone cell 10A, which contains no "on" points 14 and thus no dot pattern, intermediate shade values such as that corresponding to halftone cell 10B, which contains a centered dot pattern, and a darkest shade value corresponding to halftone cell 10C, in which all of the addressable points are "on" such that the halftone dot pattern fills the entire cell. In practice, the individual halftone cells 10 are stored in a cache memory associated with an inkjet printer system as "glyphs" that are precomputed for each shade value in shade value range 18. The stored glyphs increase the speed of the halftone printing process by eliminating the need for shade value computation each time a new image is to be printed. Rather, a processor matches image data with appropriate glyphs stored in the memory, based on shade value, and then controls the inkjet printer to print a representation of the glyph.

Figure 3:
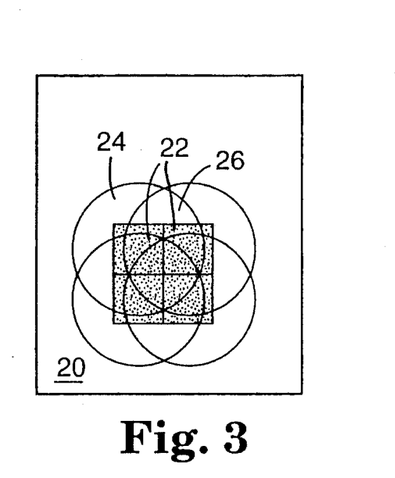
FIG. 3 is a diagram of a printing substrate on which a high addressability representation of an interior portion of the halftone dot pattern of FIG. 1 is printed by the formation of ink spots.

FIG. 3 illustrates over-inking problems associated with higher addressability inkjet printing. Specifically, FIG. 3 is a diagram of a printing substrate 20 on which a high addressability representation of an interior portion of halftone dot pattern 16 is printed by the formation of ink spots. The interior portion of high addressability dot pattern 16 includes "on" points 22, represented on printing substrate 20 as ink spots 24. The ink spots 24 are centered on locations corresponding to the respective "on"0 points 22, but cover a larger area because the inkjet printing system normally prints each "on" point as a disk. The size of the disk relative to the size of cell 10 is determined by the relationship between the point addressability and the true ink spot "resolution" of the inkjet printing system.

When higher addressability is employed, the printed dot pattern exhibits significant overlap between adjacent ink spots 24, as indicated by reference numeral 26. With lower addressability, overlap exists to some degree, but is manageable. The larger and more dense overlap 26 occurring with higher addressability causes excessive dot gain from accumulation of ink in the interior portion of the printed dot pattern 16. The excess ink resulting from higher addressability not only increases the shade density of the interior of dot pattern 16, but also can have a significant effect on overall size of the printed dot pattern due to ink smearing and wicking into the oversaturated printing substrate 20. Consequently, the shade value of the resulting printed dot pattern 16 may not match the desired shade value.

Figure 4:
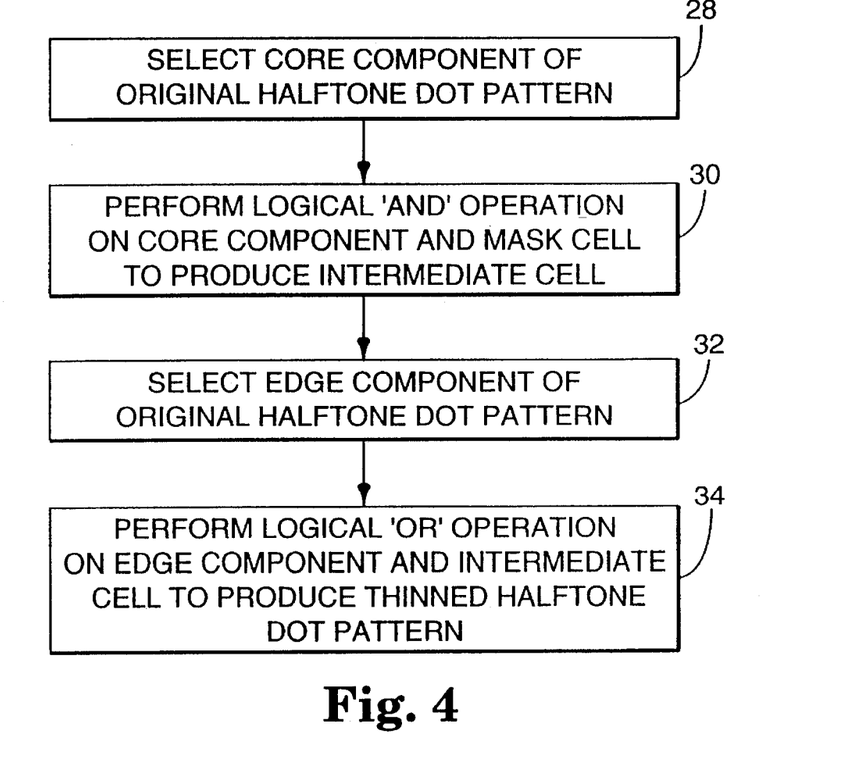
FIG. 4 is a flow diagram illustrating a method for generating a set of thinned halftone dot patterns, in accordance with the present invention.
Figure 5:
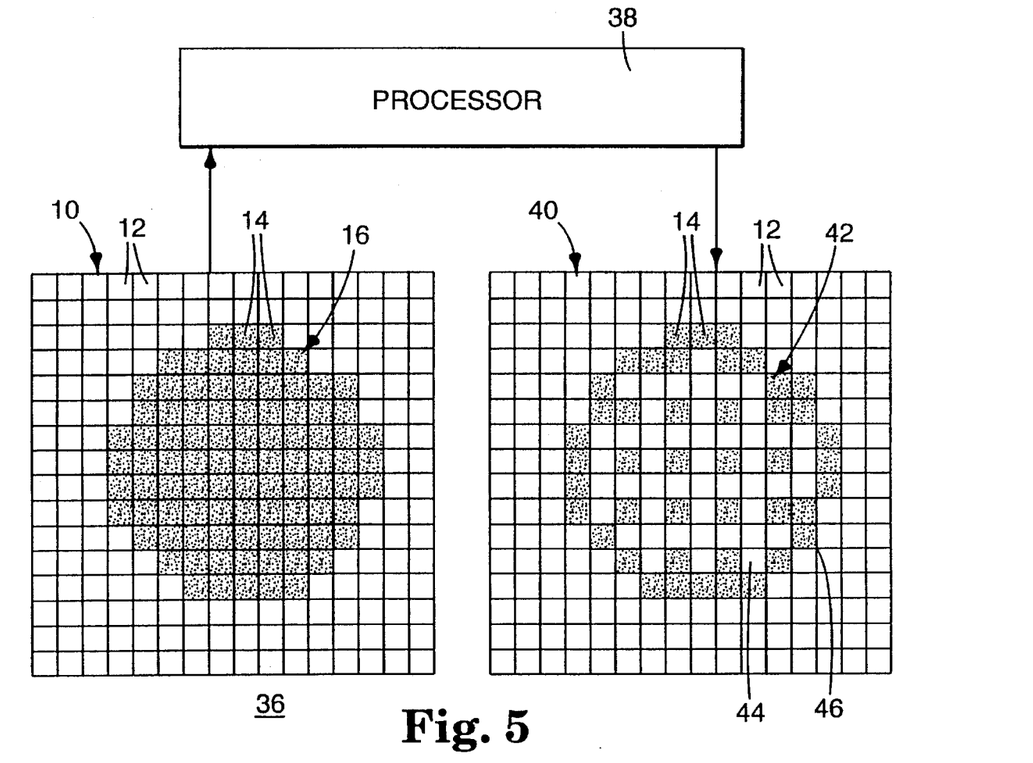
FIG. 5 is a functional block diagram illustrating a system for generating a set of thinned halftone dot patterns, in accordance with the present invention.

In accordance with the present invention, a set of thinned halftone dot patterns is provided that alleviates the higher addressability printing problems illustrated in FIG. 3. FIGS. 4 and 5 illustrate a method and system, respectively, for generating a set of thinned halftone dot patterns, in accordance with the present invention. FIG. 4 is a flow diagram illustrating the steps in the method, whereas FIG. 5 is a functional block diagram illustrating the structure of the system. It will be appreciated that the system of FIG. 5 essentially is a representation of various hardware or software means capable of implementing the method.

The set of thinned halftone dot patterns enables the use of higher addressability in a single- or multi-color inkjet printing system to achieve a wider range of shade values, but avoids undesirable over-inking of printed halftone dot patterns. The thinned halftone dot pattern is produced by generating a first halftone cell defined by a plurality of addressable points arranged in a matrix, with at least some of the points being turned "on" to define a halftone dot pattern. A plurality of the "on" points defining a core component of the halftone dot pattern are then selected, and at least some of the "on" points of the core component are selectively turned "off" to produce a thinned halftone dot pattern. The set of thinned halftone dot patterns prevents significant overlap between adjacent ink spots in a core component when the dot pattern is printed by the inkjet printing system, but preserves an edge component to maintain the ability to incrementally change shade values.

The method shown in FIG. 4 represents the selective turning "off" at least some of the points of the core component of a halftone dot pattern to produce the thinned halftone dot pattern. The steps in the flow diagram of FIG. 4 will be described with respect to the halftone cell 10 and halftone dot pattern 16 of FIG. 1. To produce a thinned halftone dot pattern, the core component of halftone dot pattern 16 is first selected, as indicated by block 28 of FIG. 4. A logical AND operation is performed on the core component and a mask cell to produce an intermediate cell, as indicated by block 30. An edge component of original halftone dot pattern 16 is then selected, as indicated by block 32, and subjected to a logical OR operation with the intermediate cell to produce the thinned halftone dot pattern, as indicated by block 34. Because the edge component is ORed with the intermediate cell and thus will become part of the thinned halftone dot pattern anyway, it is conceivable that the core component need not be selected for the initial AND operation. Rather, the entire original halftone dot pattern 16 could be ANDed with the mask cell, and then the edge component could be selected prior to the subsequent OR operation.

In FIG. 5, a system 36 is shown that includes a processor 38 for converting an original halftone cell 10 into a thinned halftone cell 40. The processor 38 essentially implements, in software, the steps of the method described with reference to FIG. 4. The processor 38 alternatively could be realized by a hardware implementation of the method. The resulting thinned halftone cell 40 contains a plurality of addressable points, with at least some of the points being turned "on" to define thinned halftone dot pattern 42. The thinned halftone dot pattern 42 has a plurality of "on" points defining a thinned core component 44 and a plurality of "on" points defining an unthinned edge component 46.

Figure 6:
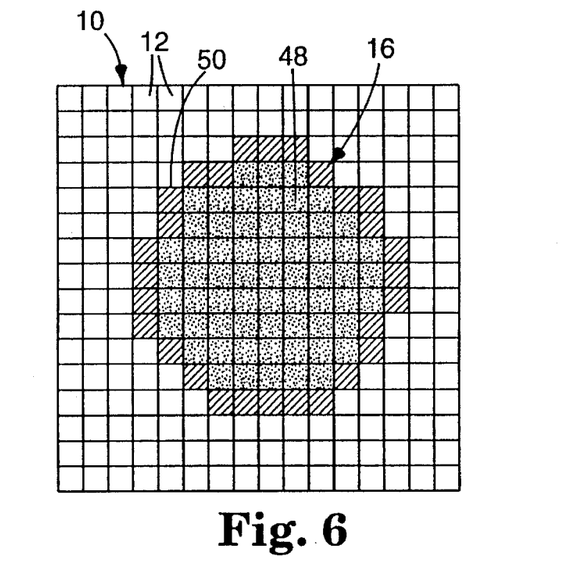
FIG. 6 is a bitmap diagram of the halftone ceil shown in Fig. 1 with the halftone dot pattern separated into a core component and an edge component, in accordance with the present invention.

The operation of the system and method of the present invention will be further described with reference to FIGS. 6–11. FIG. 6 is a bitmap diagram of halftone cell 10 with original halftone dot pattern 16 separated into a core component 48 and an edge component 50, in accordance with the present invention. The core component 48 can be selected, as indicated by block 28 of FIG. 4, by performing a logical AND operation on original halftone dot pattern 16 and copies of the original halftone dot pattern that have been shifted up, down, left, and right, respectively, by a single addressable point. After selecting core component 48, edge component 50 can be selected for the subsequent step, indicated by block 32 of FIG. 4, by simply subtracting the core component from original halftone dot pattern 16.

Figure 7:
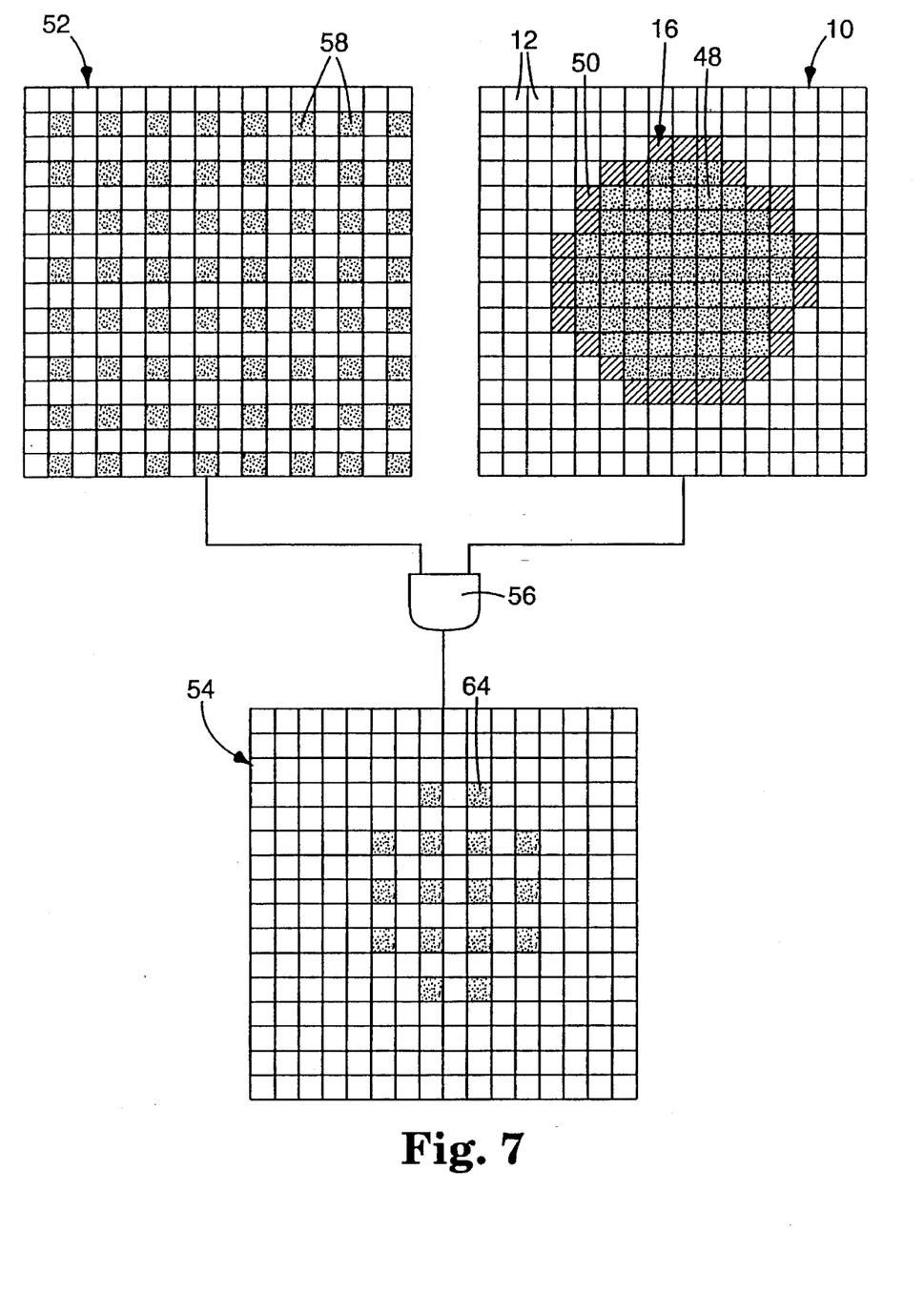
FIG. 7 is a diagram of a step in the method illustrated in FIG. 4, showing the performance of a logical AND operation on the core component of the halftone dot pattern of FIG. 1 and a mask cell to produce an intermediate cell, in accordance with the present invention.

FIG. 7 is a diagram illustrating the performance of the logical AND operation on core component 48 of original halftone dot pattern 16 and a mask cell 52 to produce an intermediate cell 54, according to the step indicated by block 30 of Fig. 4. The AND operation is represented in FIG. 7 by an AND gate 56. The mask cell 52 is defined by a plurality of addressable points arranged in a matrix, with at least some of the second points being "on" points 58 that define a mask pattern. The density of the mask pattern is configured according to the degree of addressability involved in the printing application. For example, if the addressability of an inkjet printing system with a nominal resolution of 300 dots per inch (dpi) is increased to 600 dpi by increasing both vertical and horizontal addressability, mask cell 52 may be configured such that one in every four of the addressable points is an "on" point 58 to realize a "one-in-four" mask pattern. The mask cell 52 of FIG. 7 is an example of a "one-in-four" mask pattern.

Figure 8:
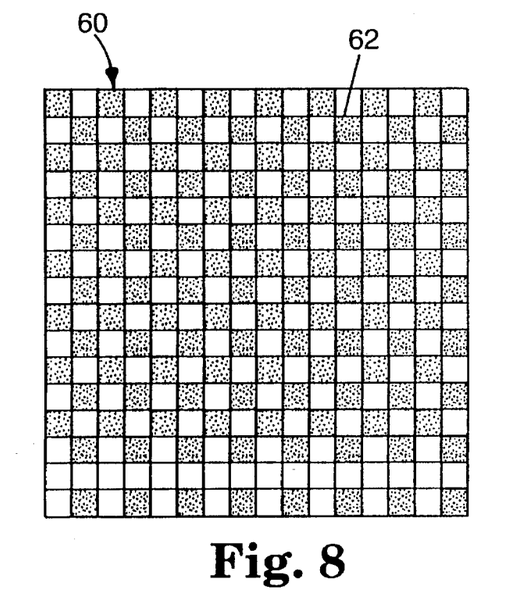
FIG. 8 is a bitmap diagram of an alternative mask cell for use in the step shown in FIG. 7, in accordance with the present invention.

The addressability of an inkjet printing system also can be increased, however, by simply changing the data rate within a line to double only horizontal addressability, or by changing line-to-line step size to double only vertical addressability. In either case, the mask pattern more appropriately may be configured as a "one-in-two" mask pattern in which one of every two second points is an "on" point, producing a checkerboard-like pattern. FIG. 8 is a bitmap diagram of an alternative mask cell 60 having a "one-in-two" mask pattern defined by "on" points 62. The alternative mask cell 60 is suitable for use when higher addressability has been achieved by either doubling horizontal addressability or doubling vertical addressability of the inkjet printing system.

For either a "one-in-four" or a "one-in-two" mask pattern, the "on" points in the mask cell define a mask pattern that matches the original 300 dpi addressable points 12 of halftone dot pattern 16 in a higher addressability 600 dpi matrix. The intermediate cell 54 resulting from the logical ANDing of core component 48 and the mask cell is defined by a plurality of addressable points arranged in a matrix, with at least some of the points being "on" points 64 that define an intermediate dot pattern, as shown in FIG. 7. As shown in FIG. 7, the performance of the logical AND operation on core component 48 and mask cell 52, by its nature, results in an intermediate cell 54 that retains only "on" points 64 that were "on" in both the mask cell and the core component.

Figure 9:
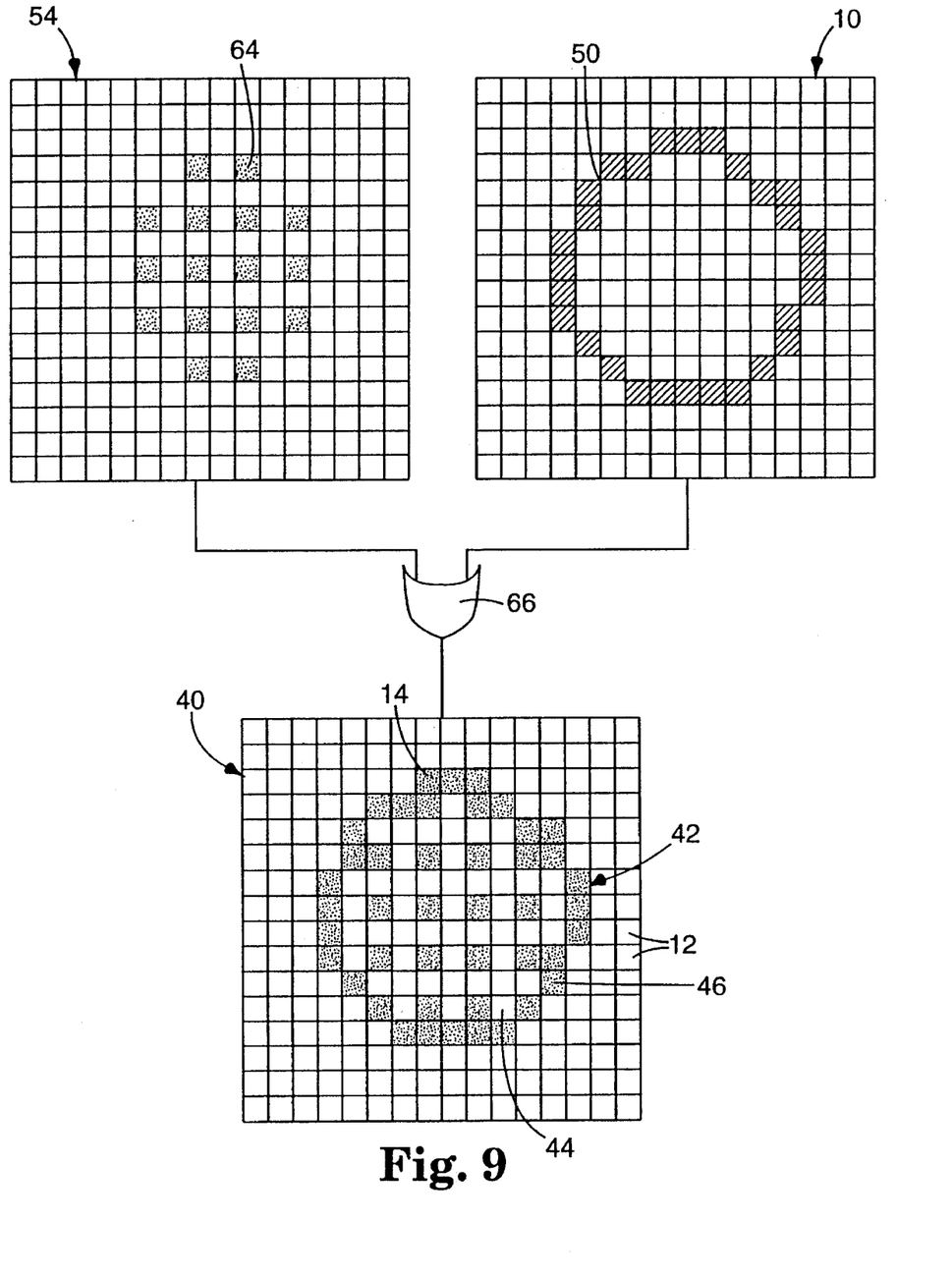
FIG. 9 is a diagram of another step in the method illustrated in FIG. 4, showing the performance of a logical OR operation on an edge component of the halftone dot pattern of FIG. 1 and the intermediate cell of FIG. 7 to produce a thinned halftone dot pattern, in accordance with the present invention.

FIG. 9 is a diagram illustrating the performance of a logical OR operation on edge component 50 of original halftone dot pattern 16 and intermediate cell 54 to produce thinned halftone cell 40, according to the step indicated by block 34 of Fig. 4. The edge component 50 is first selected, as indicated by block 32 of FIG. 4, by subtracting core component 48 from halftone dot pattern 16. The OR operation is represented in FIG. 9 by an OR gate 66. The resulting thinned halftone cell 40 is defined by a plurality of addressable points, with at least some of the points being "on" points 14 that define thinned halftone dot pattern 42. As a result of the logical OR operation, thinned halftone dot pattern 42 combines both "on" points existing in intermediate cell 54 and "on" points defining edge component 50 in original halftone dot pattern 16. The "on"0 points define core component 44 and edge component 46 of thinned halftone dot pattern 42. The thinned halftone dot pattern 42 effectively thins the distribution of "on" points within core component 44 to avoid significant overlap in the interior of halftone dot pattern 16, but preserves all of the "on" points making up edge component 46, thereby maintaining definition of cell 10.

Figure 10:
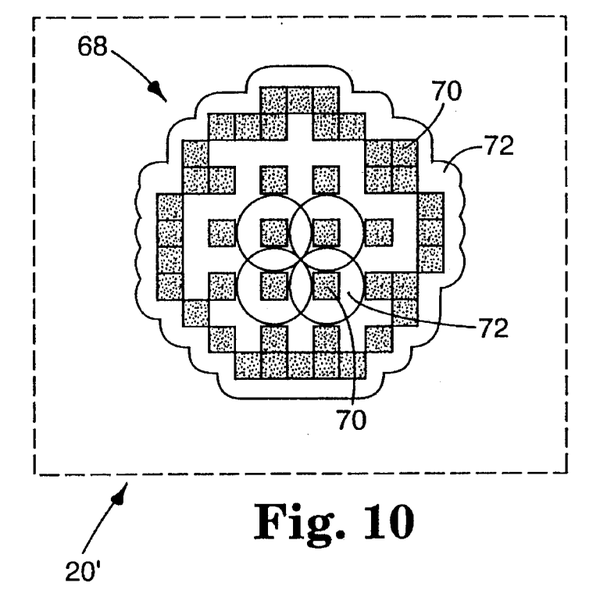
FIG. 10 is a diagram of a printing substrate on which a high addressability representation of the thinned halftone dot pattern shown in FIG. 9 is printed by the formation of ink spots, in accordance with the present invention.

FIG. 10 is a diagram of a printing substrate 20' on which a high addressability representation 68 of thinned halftone dot pattern 42 is printed by the formation of ink spots. In FIG. 10, reference numeral 70 represents "on" points defining thinned halftone dot pattern 42, whereas reference numeral 72 represents ink spots placed on printing substrate 20' in positions corresponding to the "on" points. Although the distribution of "on" points 70 may appear somewhat sparse in the interior of printed representation 68, the ink spots 72 placed at the position of each "on" point have diameters that provide a degree of overlap sufficient to fill the interior, as shown in FIG. 10. In effect, the ink spots making up core component 44 of thinned halftone dot pattern 42 are defined by a low addressability matrix, determined by the mask pattern, whereas the ink spots making up the edge component 46 are defined according to the higher addressability matrix. The printed overlap in the thinned core component 48 is sufficient to maintain a solid interior within the printed representation 68 of thinned halftone dot pattern 42 without over-inking. At the same time, the unthinned edge component 46 in thinned halftone dot pattern 42 maintains a smooth appearance capable of achieving subtle effective changes in the size of the printed representation 68.

The system and method described with reference to FIGS. 4–10 ordinarily will produce a thinned halftone dot pattern sufficient to avoid excessive dot gain. When the size of printed ink spots is very large relative to spot-to-spot spacing, however, it may be advantageous to thin the edge component of the original halftone dot pattern, as well as the core component. The edge component can be thinned in a number of ways. For example, an AND operation can be performed on the edge component and an additional mask cell before performing the OR operation on the edge component and the intermediate cell. To maintain a relatively smooth edge component, the additional mask cell preferably would be configured to thin only spots in the middle of extended horizontal and vertical runs in the edge component. Specifically, spots with neighboring spots to the both the left and right could be eliminated with little effect on smoothness, whereas diagonally adjacent spots preferably would be preserved.

Figure 11:
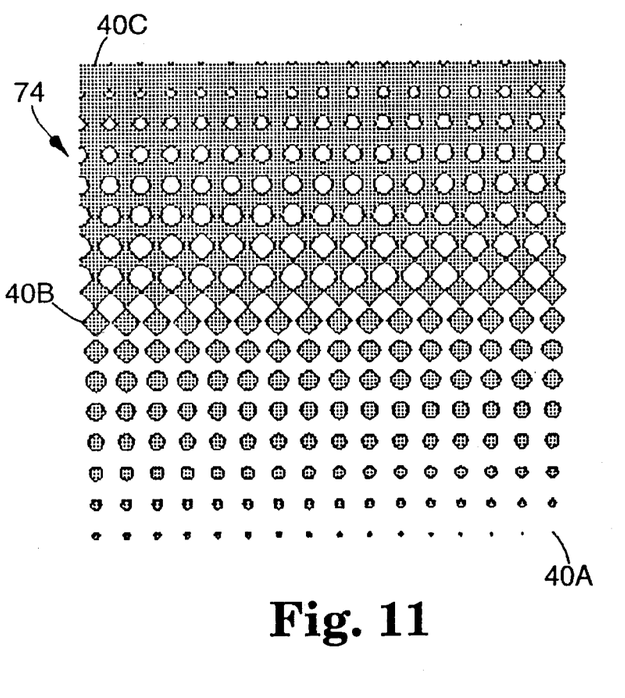
FIG. 11 is a bitmap diagram illustrating a range of shade values for a halftone cell employing a set of thinned halftone dot patterns, in accordance with the present invention.

The system and method can be repeated for every halftone cell 10 in original shade value range 18, and the resulting thinned halftone cells stored in a memory as "glyphs," for retrieval by an inkier printing system. For example, FIG. 11 is a bitmap diagram illustrating a shade value range 74 for the thinned halftone cells. Like original shade value range 18, thinned shade value range 74 is based on the sixteen-by-sixteen matrix of addressable points 12 and comprises 256 different shade values. However, each shade value is represented by a sixteen-by-sixteen point halftone cell 40 having a different thinned halftone dot pattern 42. The thinned shade value range 74 includes a lightest shade value corresponding to thinned halftone cell 40A, intermediate shade values such as that corresponding to thinned halftone cell 40B, and a darkest shade value corresponding to thinned halftone cell 40C. None of the thinned halftone cells represented in thinned shade value range 74 is completely filled with "on" points. In accordance with the present invention, however, the "on" points within each thinned halftone cell are properly thinned such that ink spots placed during formation of the printed thinned halftone dot pattern overlap to fill the interior of the dot pattern.

Figure 12:
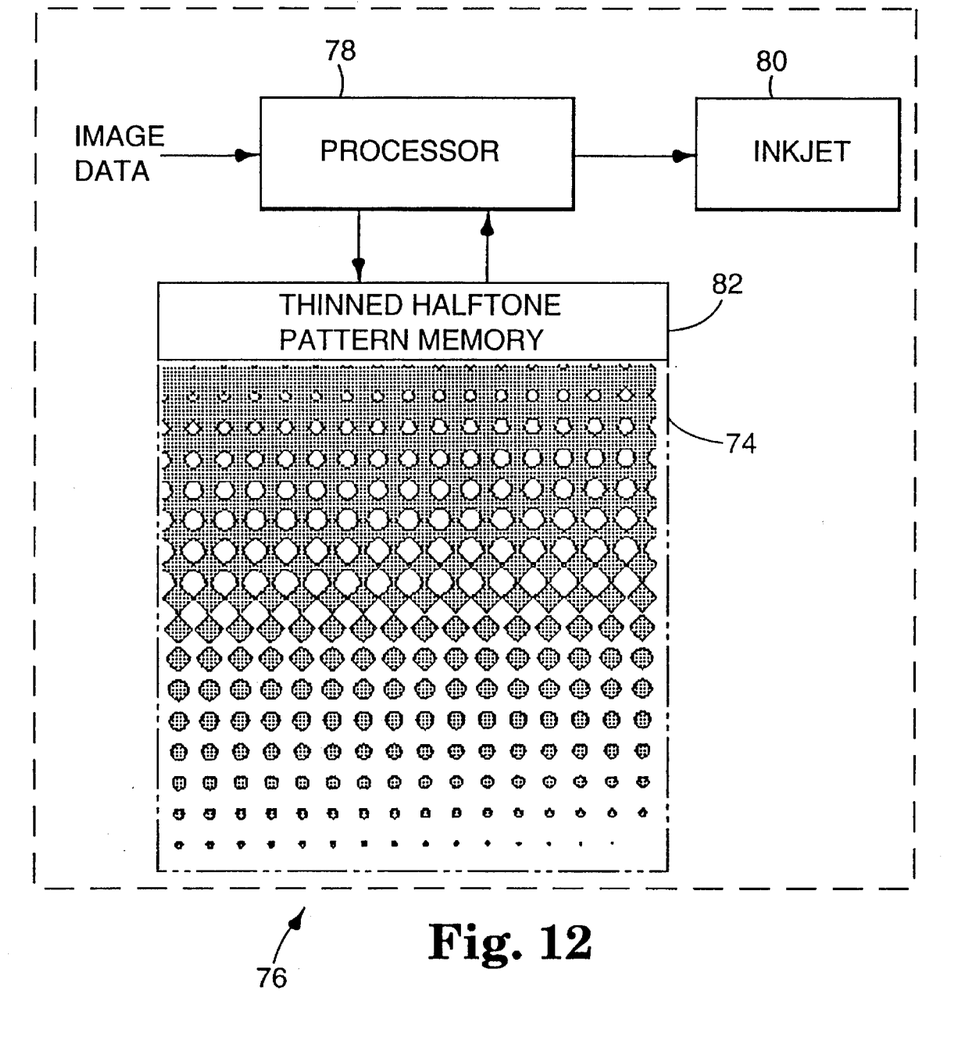
FIG. 12 is a functional block diagram illustrating an inkjet printing system employing a set of thinned halftone dot patterns, in accordance with the present invention.

FIG. 12 is a functional block diagram illustrating an inkjet printing system 76 employing thinned halftone dot patterns, in accordance with the present invention. The system 76 implements an inkjet printing method, in accordance with the present invention. The system 76 includes a processor 78, an inkjet 80, and a thinned halftone cell memory 82. The processor 78 receives image data representing a plurality of halftone image dots from a host computer (not shown). Each of the image dots has one of a plurality of different shade values corresponding to a shade value present in a corresponding area of an original continuous tone image. Based on the shade value of the respective image dot, processor 78 matches each of the image dots with one of a plurality of thinned halftone cells stored in thinned halftone cell memory 82 as "glyphs." Each of the thinned halftone cells in memory 82 corresponds to a respective shade value and represents the result of the method for generating thinned halftone cells, in accordance with the present invention. Specifically, each thinned halftone cell stored in memory 82 is the result of a logical AND operation performed on a core portion of the original, unthinned halftone cell and a mask cell to produce an intermediate cell, followed by a logical OR operation performed on the intermediate cell and an edge component of the original, unthinned halftone cell to produce the thinned halftone cell. After matching each image dot with a respective thinned halftone cell, processor 78 controls inkjet 80 to print a representation of the thinned halftone cell on a printing substrate.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A method for generating a thinned halftone dot pattern for inkjet printing, the method comprising the steps of:

generating a halftone cell defined by a plurality of addressable points arranged in a matrix, at least some of said points being turned "on" to define a halftone dot pattern;

selecting a plurality of said "on" points defining a core component of said halftone dot pattern;

selecting a plurality of said "on" points defining an edge component of said halftone dot pattern;

selectively turning "off" at least some of said "on" points of said core component; and combining said core component and said edge component to produce the thinned halftone dot pattern.

2. The method of claim 1, wherein said step of selectively turning "off" at least some of said points of said core component includes the step of:

performing a logical AND operation on the selected plurality of said "on" points defining said core component and a mask cell, said mask cell being defined by a plurality of second, addressable points arranged in a matrix, at least some of said second points being turned "on" to define a mask pattern, wherein said logical AND operation produces an intermediate cell defined by a plurality of third, addressable points arranged in a matrix, at least some of said third points being turned "on" as a result of said logical AND operation to define an intermediate pattern, and said step of combination said core component and said edge component includes the step of:

performing a logical OR operation on the selected plurality of said "on" points defining said edge component of said halftone dot pattern and said intermediate cell to produce the thinned halftone dot pattern.

3. The method of claim 2, wherein one in every two of said second points of said mask cell is turned "on".

4. The method of claim 2, wherein one in every four of said second points of said mask cell is turned "on".

5. The method of claim 2, wherein said step of performing said logical AND operation on the selected plurality of said "on" points defining said core component and said mask cell includes the step of performing a logical AND operation on said halftone cell and said mask cell to produce said intermediate cell.

6. The method of claim 2, further comprising the step of printing a representation of said thinned halftone dot pattern on a printing substrate using an inkjet printer.

7. A system for generating a thinned halftone dot patterns for inkjet printing, the system comprising:

means for generating a halftone cell defined by a plurality of addressable points arranged in a matrix, at least some of said points being turned "on" to define a halftone dot pattern;

means for selecting a plurality of said "on" points defining a core component of said halftone dot pattern;

means for selectively plurality of said "on" points defining an edge component of said halftone dot pattern;

means for selectively turning "off" at least some of said "on" points of said core component; and means for combining said core component and said edge component to produce the thinned halftone dot pattern.

8. The system of claim 7, wherein said means for selectively turning "off" at least some of said "on" points of said core component includes:

means for performing a logical AND operation on the selected plurality of said "on" points defining said core component and a mask cell, said mask cell being defined by a plurality of second, addressable points arranged in a matrix, at least some of said second points being turned "on" to define a mask pattern, wherein said logical AND operation produces an intermediate cell defined by a plurality of third, addressable points arranged in a matrix, at least some of said third points being turned "on"0 as a result of said logical AND operation to define an intermediate pattern, and said means for combining said core component and said edge component includes:

means for performing a logical OR operation on the selected plurality of said "on" points defining said edge component of said halftone dot pattern and said intermediate cell to produce the thinned halftone dot pattern.

9. The system of claim 7, wherein one in every two of said second points of said mask cell is turned "on".

10. The system of claim 7, wherein one in every four of said second points of said mask cell is turned "on".

11. The system of claim 8, wherein said means for performing said logical AND operation on the selected plurality of said "on" points defining said core component and said mask cell includes means for performing a logical AND operation on said halftone cell and said mask cell to produce said intermediate cell.

12. The system of claim 7, further comprising means for printing a representation of said thinned halftone dot pattern on a printing substrate using an inkjet printer.

13. An inkjet printing method employing a set of thinned halftone dot patterns, the method comprising the steps of:

storing in a memory a plurality of thinned halftone dot patterns;

receiving image data representing a plurality of image dots, each of said image dots having one of a plurality of shade values;

matching each of said image dots with one of a plurality of thinned halftone dot patterns stored in said memory based on the shade value of a respective one of said image dots, wherein each of said thinned halftone dot patterns in said memory corresponds to a respective one of said shade values, wherein each of the thinned halftone dot patterns is formed by the following steps:

generating a halftone cell defined by a plurality of addressable points arranged in a matrix, at least some of said points being turned "on" to define a halftone dot pattern, wherein said halftone dot pattern corresponds to the respective one of said shade values, selecting a plurality of said "on" points defining a core component of said halftone dot pattern, and selectively turning "off" of at least some of said "on" points of said core component to produce one of said plurality of thinned halftone dot patterns; and printing, for each of said dot images, a representation of a respective one of said thinned halftone dot patterns matched with each of said image dots on a printing substrate.

14. The inkjet printing method of claim 13, wherein said selective turning "off" of at least some of said points of said core component includes:

performance of a logical AND operation on the selected plurality of said "on" points defining said core component and a mask cell, said mask cell being defined by a plurality of second, addressable points arranged in a matrix, at least some of said second points being turned "on" to define a mask pattern, wherein said logical AND operation produces an intermediate cell defined by a plurality of third, addressable points arranged in a matrix, at least some of said third points being turned "on" as a result of said logical AND operation to define an intermediate pattern;

selection of a plurality of said "on" points of said halftone dot pattern defining an edge component of said halftone dot pattern; and performance of a logical OR operation on the selected plurality of said "on " points defining said edge component of said halftone dot pattern and said intermediate cell to produce said one of said plurality of thinned halftone dot patterns.

15. The method of claim 13, wherein one in every two of said second points of said mask cell is turned "on".

16. The method of claim 13, wherein one in every four of said second points of said mask cell is turned "on".

17. The method of claim 14, wherein said performance of said logical AND operation on the selected plurality of said "on " points defining said core component and said mask cell includes performance of a logical AND operation on said halftone cell and said mask cell to produce said intermediate cell.

18. An inkjet printing system employing a set of thinned halftone dot patterns, the system comprising:

a memory storing a plurality of thinned halftone dot patterns;

means for receiving image data representing a plurality of image dots, each of said image dots having one of a plurality of shade values;

means for matching each of said image dots with one of a plurality of said thinned halftone dot patterns stored in said memory based on the shade value of respective one of said image dots, wherein each of said thinned halftone dot patterns in said memory corresponds to a respective one of said shade values, wherein each of the thinned halftone dot patterns is formed by:

generating means for generating a halftone cell defined by a plurality of addressable points arranged in a matrix, at least some of said points being turned "on" to define a halftone dot pattern, wherein said halftone dot pattern corresponds to one of said shade values, selecting means for selecting a plurality of said "on" points defining a core component of said halftone dot pattern, and selective means for selectively turning "off" of at least some of said "on" points of said core component to produce one of said plurality of thinned halftone dot patterns; and means for printing, for each of said dot images, a representation of one of said thinned halftone dot patterns matched with each of said image dots on a printing substrate.

19. The inkjet printing system of claim 18, wherein said selective turning "of" of at least some of said "on" points of said core component includes:

performance of a logical AND operation on the selected plurality of said "on" points defining said core component and a mask cell, said mask cell being defined by a plurality of second, addressable points arranged in a matrix, at least some of said second points being turned "on"0 to define a mask pattern, wherein said logical AND operation produces an intermediate cell defined by a plurality of third, addressable points arranged in a matrix, at least some of said third points being turned "on" as a result of said logical AND operation to define an intermediate pattern;

selection of a plurality of said "on" points of said halftone dot pattern defining an edge component of said halftone dot pattern; and performance of a logical OR operation on the edge component of said halftone dot pattern and said intermediate cell to produce said one of said plurality of thinned halftone dot patterns.

20. The system of claim 18, wherein one in every two of said second points of said mask cell is turned "on".

21. The system of claim 18, wherein one in every four of said second points of said mask cell is turned "on".

22. The system of claim 19, wherein said performance of said logical AND operation on the selected plurality of said "on" points defining said core component of said halftone dot pattern and said mask cell includes performance of a logical AND operation on said halftone cell and said mask cell to produce said intermediate cell.

23. A set of thinned halftone dot patterns for inkjet printing, the electronic representation of the set comprising:

a plurality of halftone cells, each of said halftone cells corresponding to a respective one of a plurality of shade values;

a plurality of addressable points within each of said halftone cells, at least some of said points being turned "on" to define a halftone dot pattern; and a plurality of said "on" points defining a core component of said halftone dot pattern being selectively turned "off", wherein the "off" points of said core component represent a result of:

selection of the plurality of said "on" points defining the core component; selection of a plurality of said "on" points defining an edge component of said halftone dot pattern:

selective turning "off" of at least some of said "on" points of said core component, and combination of said core component and said edge component to produce one of the thinned halftone dot patterns.

24. The memory of claim 23, wherein the "off" points of said core component represent a result of:

performance of a logical AND operation on the selected plurality of said "on" points defining said core component of said halftone dot pattern of each of said halftone cells and a mask cell, said mask cell being defined by a plurality of second, addressable points arranged in a matrix, at least some of said second points being turned "on" to define a mask pattern, wherein said logical AND operation produces an intermediate cell defined by a plurality of third, addressable points arranged in a matrix, at least some of said third points being turned "on" as a result of said logical AND operation to define an intermediate pattern; and performance of a logical OR operation on the selected plurality of said "on" points defining said edge component of said halftone dot pattern and said intermediate cell to produce the thinned halftone dot pattern.

25. The memory of claim 24, wherein said performance of said logical AND operation on the selected plurality of said "on" points defining said core component of said halftone dot pattern of each of said halftone cells and said mask cell includes performance of a logical AND operation on said halftone cell and said mask cell to produce said intermediate cell.

26. An inkjet printing method employing a set of thinned halftone dot patterns, the method comprising the steps of:

storing in a memory a plurality of thinned halftone dot pattern;

receiving image data representing a plurality of image dots, each of said image dots having one of a plurality of shade values;

matching each of said image dots with one of plurality of said thinned halftone dot patterns stored in said memory based on the shade value of a respective one of said image dots, wherein each of said thinned halftone dot patterns in said memory corresponds to a respective one of said shade values, wherein each of the thinned halftone dot patterns is formed by the following steps:
generating a halftone cell defined by a plurality of addressable points arranged in a matrix, at least some of said points turned "on" to define a halftone dot respective one of said shade values, and pattern, wherein said halftone dot pattern corresponds to a respective one of said shade values, and selectively turning "off " of at least some of said addressable points of said halftone cell to produce one of said plurality of thinned halftone dot patterns; and printing, for each of said dot images, a representation of a respective one of said thinned halftone dot patterns matched with each of said image dots on a printing substrate.

\* \* \* \* \*

UNITED STATES PATENT AND TRADEMARK OFFICE
CERTIFICATE OF CORRECTION

PATENT NO.: 5,602,572
DATED: February 11, 1997
INVENTOR(S): Rylander

It is certified that error appears in the above-identified patent and that said Letters Patent is hereby corrected as shown below:

Col. 2, line 57, "turning "of off" of" should be --turning "off" of--.

Col. 3, line 53, "ceil" should be --cell--.

Col. 4, line 57, before "value range" please add --In Fig. 2, shade--.

Col. 5, line 25, ""on" 0 points 22" should be --"on" points 22--.

Col. 7, line 48, ""on" 0 points" should be --"on" points--.

Col. 9, line 49, "combination" should be --combining--.

Col. 10, line 1, "patterns" should be --pattern--.

Col. 10, line 9, "selectively plurality" should be --selecting a plurality--.

Col. 10, line 28, ""on"0 as" should be --"on" as--.

Col. 12, line 10, "turning "of" of" should be --turning "off" of--.

Col. 12, line 17, ""on"0 to" should be --"on" to--.

Signed and Sealed this

Twenty-eighth Day of April, 1998

Attest:

Attesting Officer

BRUCE LEHMAN

*Commissioner of Patents and Trademarks*